April 22, 1947.     J. McL. DONALD     2,419,314
HAND TRUCK FOR HANDLING BARRELS
Filed Jan. 31, 1945     2 Sheets-Sheet 1

Inventor
John McLaren Donald
by Marshall & Marshall
Attorneys

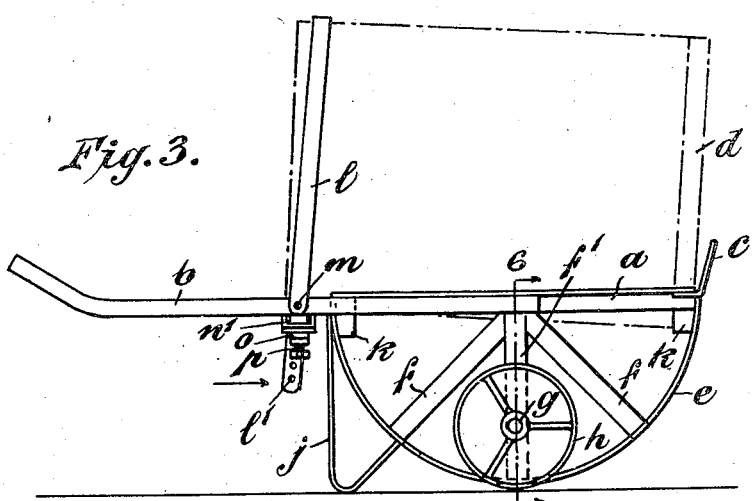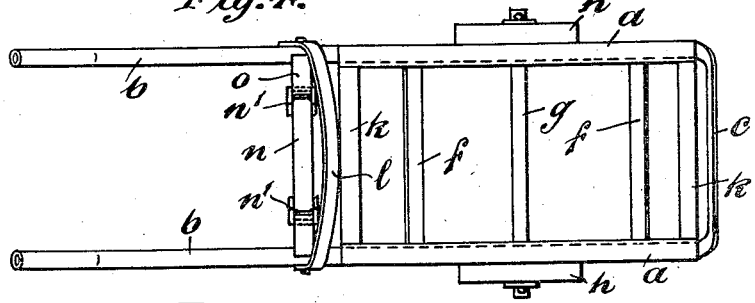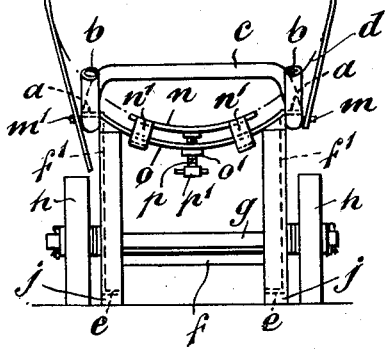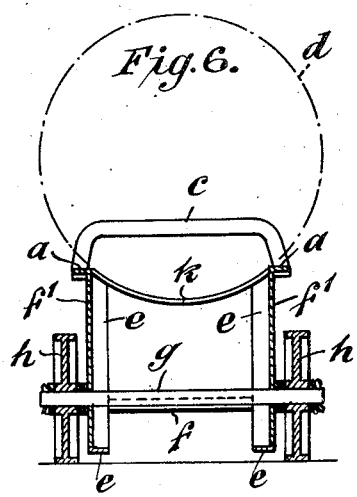

UNITED STATES PATENT OFFICE 2,419,314

HAND TRUCK FOR HANDLING BARRELS

John McLaren Donald, Birmingham, England

Application January 31, 1945, Serial No. 575,520
In Great Britain February 12, 1944

2 Claims. (Cl. 214—65.4)

This invention has reference to improvements in means for raising and transporting barrels or the like, and has for its particular object the provision of a truck or trolley which incorporates means for readily rocking the truck or trolley from say its vertical load receiving position into its horizontal or substantially horizontal load supporting and traversing position with a minimum of manual effort, so as to ease the effort of raising and transporting the load, and means for holding the load securely on the truck.

The invention consists of a hand truck comprising, in combination, a platform, arcuate rockers extending under the platform from one end of the platform, wheels for supporting the platform when in a substantially horizontal position, a clamping band for embracing a load upon the platform, a clamping member separate from the clamping band and substantially in the plane of the clamping band, and adjustable means for raising the clamping member against a load on the platform to lift the load and hold it against the clamping band.

One embodiment of the present invention will now be described with particular reference to the accompanying drawings, in which—

Figure 3 is a side elevation showing the truck or trolley in its load supporting and traversing position.

Figure 4 is a plan of Figure 3.

Figure 5 is an end elevation looking in the direction of the arrow Figure 3.

Figure 6 is a cross-sectional elevation on line 6—6 of Figure 3.

Figure 1:
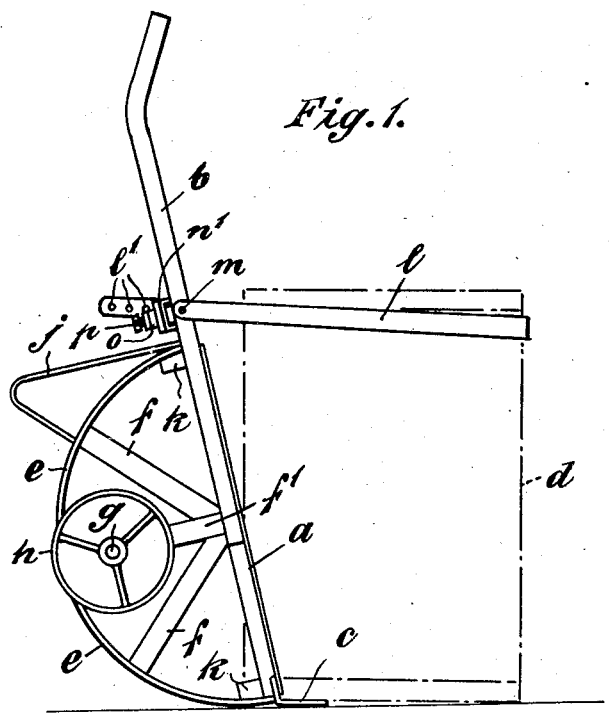
Figure 1 is a side elevation showing the truck or trolley in its load receiving position.

The truck or trolley comprises a pair of angle iron side frame members $a$ to which are connected a pair of tubular handles $b$. The one end of the side frame members is provided with a lifting and retaining lip or shoe $c$ of conventional form which constitutes an end or bottom stop for the barrel $d$ or other load to be raised and transported by the truck or trolley. The side frame members are provided with a pair of metallic segments $e$ substantially semi-circular in side elevation and these segments are cross-strutted and also stayed to the side frame members $a$ by means of the struts or stays generally designated $f$. The vertically disposed struts $f^1$ form a mounting for a transverse axle $g$ on which is mounted a pair of wheels $h$ the periphery of these wheels extending in part below the level of the periphery of the segments $e$. The truck or trolley structure is provided with a pair of feet $j$ which are utilized as a rest support for the truck or trolley when in the position seen in Figure 3. The structure of the truck or trolley is completed by some form of provision for the support of the barrel or other load $d$. In the illustrated embodiment this takes the form of a pair of arcuate straps $k$ which span the side frame members $a$, and in addition if necessary retaining straps or bands may be associated with the fixed straps $k$ to embrace the barrel or the like and secure same in the requisite position on the framework of the truck or trolley.

Additional structure is incorporated in the truck or trolley for the purpose of providing an adjustable securing and clamping means for the barrel or other load, and this comprises a flexible band or strap $l$ which at its one end is pivotally connected to a laterally extending pin $m$ on the one side and a similar laterally extending pin $m^1$ on the other side of the side members or handles of the truck frame. The one end of the band or strap $l$ is desirably formed with a series of perforations $l^1$ which admit of an initial tensioning of the band or strap so as to agree with variations in the periphery of the barrel or other load and ensure a firm grip of the band or strap about the one end of barrel or load. Other variable setting and tensioning means may be substituted for the perforations $l^1$ and pin $m^1$ without departing from the scope of the present invention.

Co-operating with this band or strap $l$ is a segment $n$ which is provided with a pair of slotted guides $n^1$ which engage about either side of an arcuate strap $o$ which is arranged in parallel with the arcuate straps $k$. The strap $o$ forms a bearing mounting by means of the tapped boss $o^1$ for an adjusting screw $p$ which is freely connected at its inner end within a central boss formed on the segment $n$. The screw is provided with an adjusting head $p^1$ and rotation of the screw will effect a variation in the setting of the segment $n$ so that the load located and held between the segment and the diametrically opposed arcuate section of the band or strap $l$ can be securely clamped and retained in position on the frame of the truck or trolley.

Figure 2:
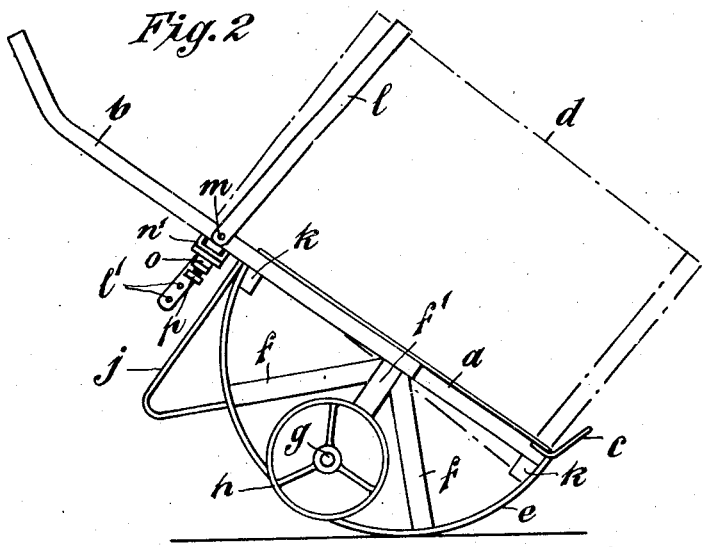
Figure 2 is a similar elevation showing the truck or trolley in its initial tipping and load raising position.

The operation of the device will be clearly seen by an examination and comparison in sequence of Figures 1, 2 and 3 of the drawings.

In order to pick up or receive the load say in the form of a barrel $d$ the truck or trolley is turned to its substantially vertical position (see Figure 1). The shoe $c$ is then engaged under the one end of the barrel which is to be raised and transported. The barrel or other load is then desirably anchored by any convenient means to the frame of the truck or trolley and the truck or trolley is then rocked as seen in Figure 2 on the forward part of the periphery of the pair of segments e until the truck or trolley assumes a substantially horizontal position as seen in Figure 3 when the truck or trolley is supported by the pair of wheels h and the load can now be readily traversed on the wheels h which are conveniently placed approximately midway below the centre of gravity of the load and at a point vertically below the axis of the centre of the segments e thereby achieving a position of balance which assists in the manipulation and transportation of the load.

It will be appreciated that this invention may be applied to other forms of truck or trolley or like transporting device than that shown in the drawings, and that the load may be applied to the truck or trolley in other ways than that indicated and described with reference to Figures 1, 2 and 3 of the drawings.

It will further be appreciated that this invention is particularly adaptable to the handling of heavy loads which could not readily be manhandled.

I claim:

1. A hand truck comprising, in combination, a platform, arcuate rockers extending under the platform from one end of the platform, wheels for supporting the platform when in a substantially horizontal position, a clamping band for embracing a load upon the platform, a clamping member separate from the clamping band and substantially in the plane of the clamping band, and adjustable means for raising the clamping member against a load on the platform to lift the load and hold it against the clamping band.

2. A hand truck comprising, in combination, a platform, arcuate rockers extending under the platform from one end of the platform, wheels for supporting the platform when in a substantially horizontal position, a clamping band for embracing a load upon the platform, an adjustable connection at one end of the band for approximately accommodating the band to the girth of the load, a clamping member separate from the clamping band and substantially in the plane of the clamping band, and adjustable means for raising the clamping member against a load on the platform to lift the load and hold it against the clamping band.

JOHN M. DONALD.

REFERENCES CITED

The following references are of record in the file of this patent:

UNITED STATES PATENTS

| Number | Name | Date |
|---|---|---|
| 1,815,825 | Bates | July 21, 1931 |
| 460,250 | Junkins | Sept. 29, 1891 |
| 1,165,076 | Curtis | Dec. 21, 1915 |
| 1,180,990 | Ergenbright | Apr. 25, 1916 |
| 665,583 | Schnellbacher | Jan. 8, 1901 |
| 1,974,675 | Hoedl | Sept. 25, 1934 |

FOREIGN PATENTS

| Number | Country | Date |
|---|---|---|
| 591,364 | German | Jan. 20, 1934 |
| 3,836 | British | Mar. 11, 1890 |